United States Patent
Piech et al.

(10) Patent No.: US 6,713,922 B2
(45) Date of Patent: Mar. 30, 2004

(54) INTEGRALLY SKEWED PERMANENT MAGNET FOR USE IN AN ELECTRIC MACHINE

(75) Inventors: Zbigniew Piech, Cheshire, CT (US); Paul Dieter Wagner, Norfolk, CT (US)

(73) Assignee: Otis Elevator Company, Farmington, CT (US)

( * ) Notice: Subject to any disclaimer, the term of this patent is extended or adjusted under 35 U.S.C. 154(b) by 133 days.

(21) Appl. No.: 09/751,922

(22) Filed: Dec. 29, 2000

(65) Prior Publication Data

US 2002/0084711 A1 Jul. 4, 2002

(51) Int. Cl.[7] .............................................. H02K 21/00
(52) U.S. Cl. ............................ 310/156.43; 310/156.47; 310/154.35
(58) Field of Search ................................ 310/152, 154, 310/156, 154.21, 156.42–156.47, 254, 154.32, 156.38, 43, 47; H02K 21/00

(56) References Cited

U.S. PATENT DOCUMENTS

| | | | | |
|---|---|---|---|---|
| 4,341,969 A | * | 7/1982 | Sievert | 310/154.21 |
| 5,034,642 A | * | 7/1991 | Hoemann et al. | 310/152 |
| 5,323,077 A | * | 6/1994 | Brandes | 310/156.47 |

* cited by examiner

*Primary Examiner*—Burton S. Mullins
*Assistant Examiner*—Karen Beth Addison
(74) *Attorney, Agent, or Firm*—Carlson, Gaskey & Olds

(57) ABSTRACT

A permanent magnet design includes a magnetic field that is skewed relative to a center line of the magnet body. One surface of the magnet is adapted to be mounted or supported on a motor assembly component such as the rotor. The other side of the magnet body includes at least one surface that is not aligned with the center line of the magnet body. When the magnet is supported on a motor component so that the magnet center line is aligned with the axis of rotation of the motor rotor, the magnetic field of the magnet is not aligned with the rotor axis.

18 Claims, 2 Drawing Sheets

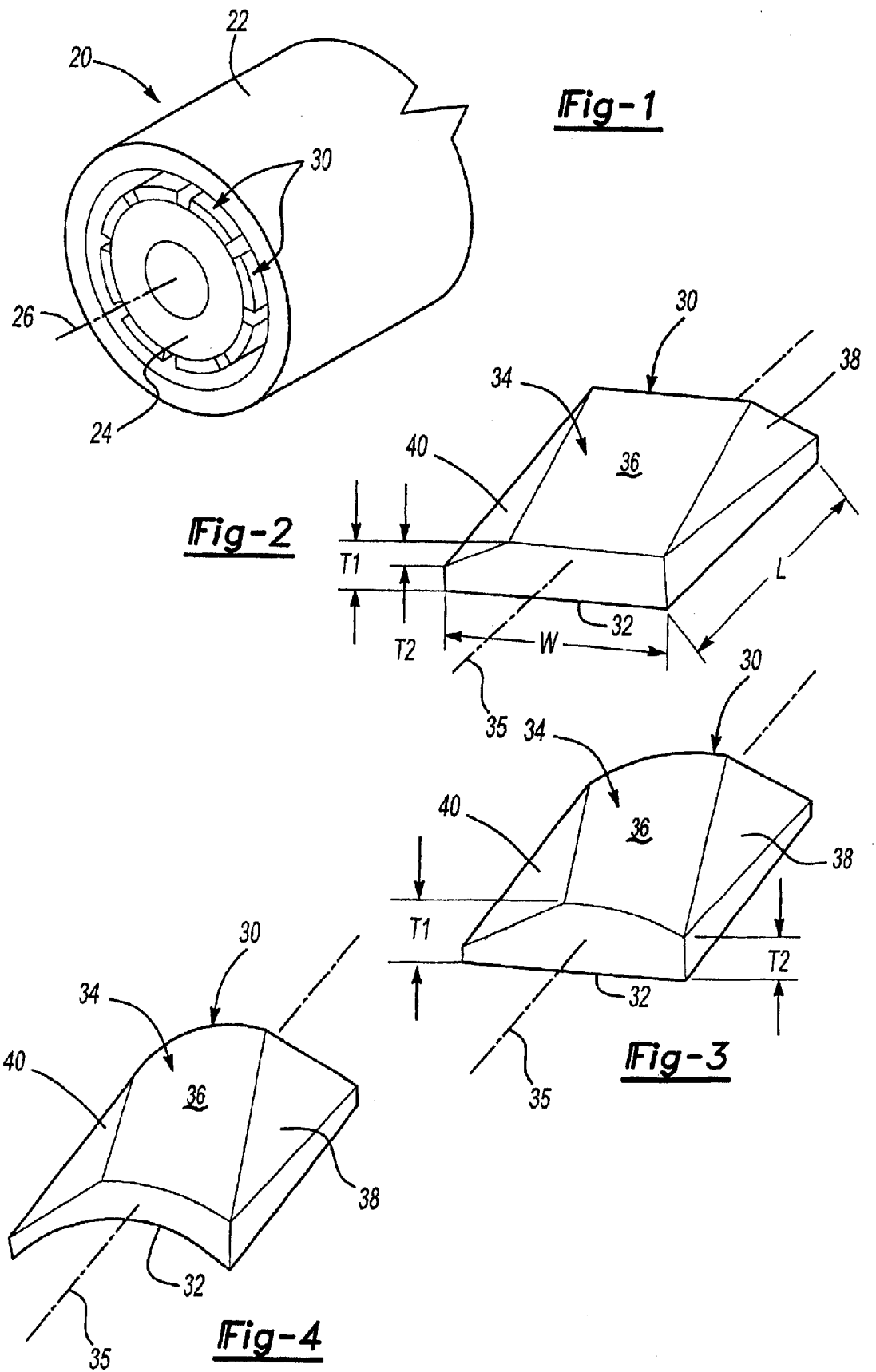

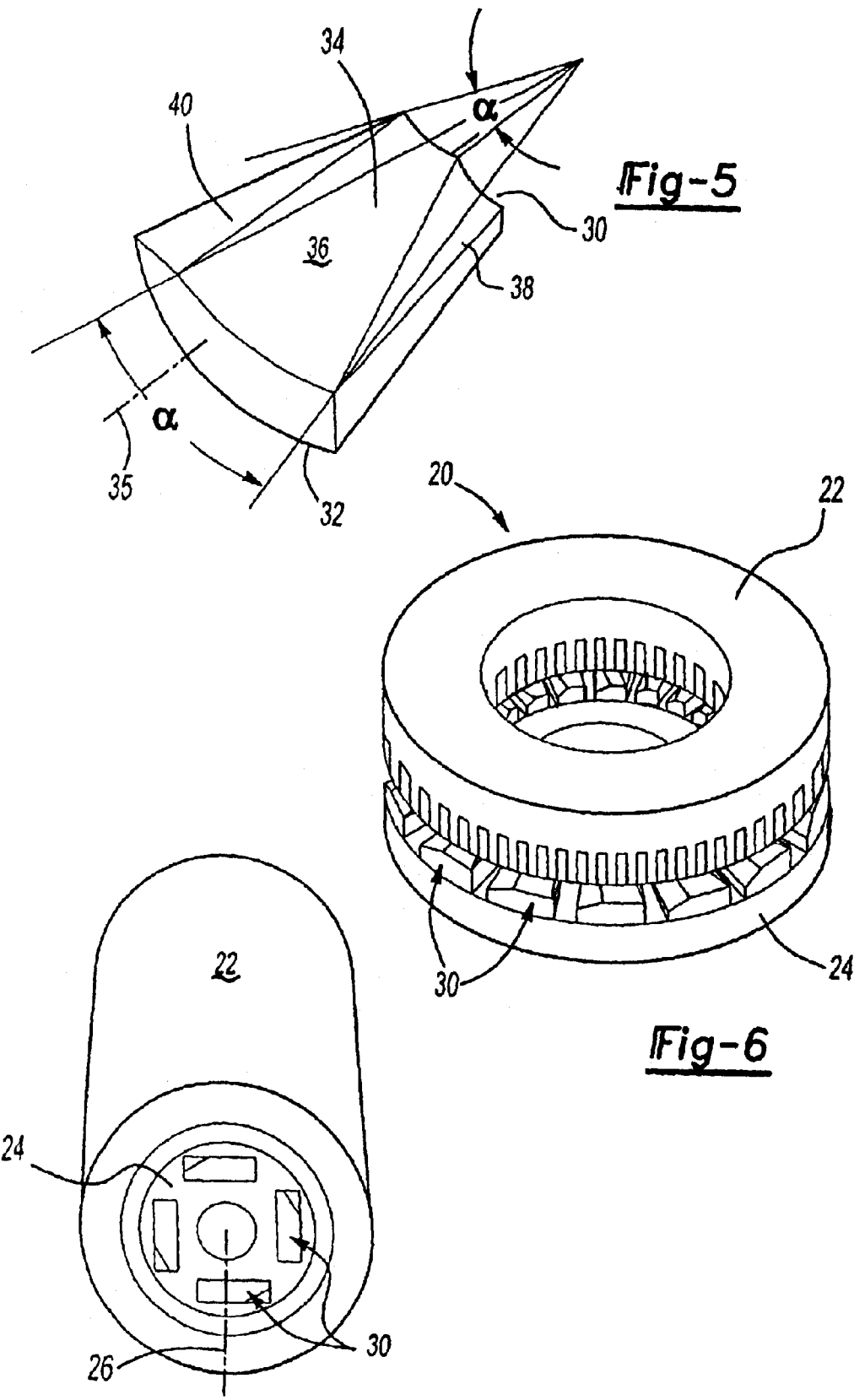

INTEGRALLY SKEWED PERMANENT MAGNET FOR USE IN AN ELECTRIC MACHINE

BACKGROUND OF THE INVENTION

This invention generally relates to a permanent magnet design that is especially useful for permanent magnet motors.

A variety of permanent magnet electric motors have been used for various purposes. A variety of challenges and difficulties must be overcome when designing such motors.

One example of a difficulty associated with permanent magnet motors is trying to overcome flux disturbances that result as the rotor moves relative to the stator. In electric induction motors, when rotor conductors move past stator slots, which have partial or full slot openings facing the air gap, disturbances result. The disturbance usually produces acoustic noise, vibration and torque pulsations. One attempt at minimizing this effect is to skew the rotor by arranging the magnets in a staggered or skewed arrangement. In another attempt the stator conductors and their slots are skewed. While this does serve to attenuate the flux disturbances, there still are difficulties to overcome. Placing and mounting skewed magnetic blocks on a cylindrical rotor is not easily accomplished. Similarly, a relatively difficult mounting process is required to accomplish the desired results in a permanent magnet linear motor. This is especially true when trying to mount magnets on the secondary portion of the motor assembly. It is especially difficult to place skewed magnets within rotors or secondaries having embedded magnets.

There is a need for a more versatile arrangement that will accommodate skewed magnets on a rotor portion of a motor assembly. Moreover, there is a need for a less cumbersome and less expensive way of accomplishing flux disturbance attenuation in permanent magnet motors. This invention addresses those needs and avoids the shortcomings and drawbacks associated with the prior art described above.

SUMMARY OF THE INVENTION

In general terms, this invention is a permanent magnet that has a body and a magnetic field that is skewed relative to the body. A permanent magnet designed according to this invention has a central axis of the body. At least one surface on the magnet is not aligned with the body axis. When a permanent magnet designed according to this invention is used in a motor assembly, the magnet body mounting surface is aligned with the rotor axis while the skewed surfaces are not aligned with the rotor axis.

A motor assembly including magnets designed according to this invention does not experience the flux disturbances that occur in other motor designs. Moreover, a motor assembly designed according to this invention is much more economical to manufacture compared to previous arrangements.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 1 schematically illustrates a motor assembly designed according to this invention.

FIG. 2 is a perspective illustration of a permanent magnet designed according to this invention.

FIG. 3 is a perspective illustration of another permanent magnet designed according to this invention.

FIG. 4 is a perspective illustration of another magnet designed according to this invention.

FIG. 5 is a perspective illustration of another magnet designed according to this invention.

FIG. 6 is a perspective illustration of a disc motor assembly designed according to this invention.

FIG. 7 is a perspective illustration of a motor assembly having embedded permanent magnets designed according to this invention.

DETAILED DESCRIPTION OF A PREFERRED EMBODIMENT

A motor assembly 20 includes a stator portion 22 and a rotor portion 24. The motor assembly 20 preferably is a permanent magnet motor assembly that produces torque or, if used as a generator, electric energy in a conventional manner except as described below.

The rotor 24 rotates about a rotor axis 26 relative to the stator 22. A plurality of magnets 30 are supported on the rotor. The stator is separated from the rotor by an air gap. When the rotor rotates, the magnets pass stator slots (not illustrated) to generate the motor torque as is understood in the art.

The magnets 30 preferably are designed having a first side 32 and a second side 34. The first side 32 parallel to the axis of the magnet is adapted to be secured to the rotor portion 24 in some examples. In others, such as shown in FIG. 7, the magnets are embedded in a desired position within the motor assembly. The second side 34 preferably includes at least one surface that is skewed relative to the body centerline 35 or axis of the magnet 30.

In the illustrated embodiments, the second side 34 of the magnet includes a first surface 36, a second surface 38, and a third surface 40. The first surface 36 has edges that are parallel to each other but not parallel to the center line or axis 35 of the magnet body. The first surface 36 preferably has a continuous width W along the entire length L of the body in the example of FIG. 2. The thickness of the magnet body, $T_1$, as taken between the first surface 36 and the first side 32, may be continuous across the width of the first surface 36. This is seen for example as the thickness $T_1$ in FIG. 2. Alternatively, the thickness of the magnet along the width of the first surface 36 may vary from a thickness $T_1$ to a thickness $T_2$ as seen in FIG. 3.

In the illustrated examples, the surfaces 38 and 40 have varying thicknesses along their widths and along their lengths (as those dimensions are indicated in the drawings).

The arrangement of surfaces on the second side 34 of the magnet 30 provides a magnetic field that has a field center line that is not aligned with the body center line 35. Therefore, when a magnet 30 is supported on the rotor 24 so that its body center line 35 is aligned with the rotor axis 26, the magnetic field of each magnet is not aligned with the axis 26.

Skewing the magnet configuration as illustrated provides for flux disturbance attenuation in a motor assembly. The magnetic and mechanical center lines of the magnet body 30 are not coincident. The shape of the magnet 30, rather than its position relative to its excited companion part in the motor assembly 20 (i.e., the stator) produces a skew, which if produced in accordance with this invention, provides relief from the reluctance variations facing the air gap that otherwise occur in motor assemblies. This provides attenuated torque pulsations and reduced magnetic noise.

A magnet designed according to this invention does not have sudden and abrupt transitions from high to low flux and then back again to high flux as the rotor 24 rotates relative to the stator 22. Instead, with this invention the transitions from high to low flux are elongated in space and time. The tilted or skewed magnet surfaces form ramps that facilitate moving from one flux level to another, which makes the transition in flux levels less severe and results in less vibration and noise.

A magnet designed according to this invention can have a flat mounting surface 32 as illustrated in FIGS. 2 and 3 or a curved mounting surface 32 as illustrated in FIG. 4 to accommodate the various designs of rotors 24 that may be desirable in different situations. The example illustrated in FIG. 2 is preferably used in motors having embedded magnet rotors or in linear motors. The example illustrated in FIG. 4 is best used in or on a cylindrical rotor. The example of FIG. 4, however, is not limited to a cylindrical rotor but is also useful for linear or disc type motors as shown in FIG. 6.

In the preferred embodiment, the magnets 30 are preferably pressed to the desired finished shape and then sintered. It is preferred to not use subsequent machining steps for production economies and to avoid mounting errors.

The preceding description is exemplary rather than limiting in nature. Variations and modifications to the disclosed embodiments may become apparent to those skilled in the art that do not necessarily depart from the purview and spirit of this invention. The scope of legal protection given to this invention can only be determined by studying the following claims.

We claim:

1. A magnet for use in a magnetic motor assembly, comprising:
   a body having a central axis with at least one edge aligned parallel to said axis along an entire length of said edge, a first side that faces in a first direction and a second side facing opposite the first side, the second side including at least one surface that is oriented to be nonparallel with the body central axis and a magnetic field having a centerline that is skewed relative to the body central axis.

2. The magnet of claim 1, wherein the second side surface includes edges that are nonparallel with the body central axis.

3. The magnet of claim 1, including a distance between the second side surface and the first side that varies along a length of the body.

4. The magnet of claim 3, wherein the second side surface is ramped relative to the first side.

5. The magnet of claim 1, including a plurality of surfaces on the second side, a first one of the surfaces having a constant width and a second one of the surfaces having a varying width.

6. The magnet of claim 5, wherein a distance between the first side and the second one of the surfaces varies along the width of the second one of the surfaces.

7. The magnet of claim 6, wherein the distance is greatest at a location where the second one of the surfaces is adjacent the first one of the surfaces and the distance is smallest at an edge of the second one of the surfaces adjacent an edge of the body.

8. The magnet of claim 1, wherein the first side is generally planar.

9. The magnet of claim 1, wherein the first side is curved.

10. A motor assembly, comprising:
    a stator;
    a rotor that rotates about a rotor axis relative to the stator; and
    a plurality of magnets supported by either the rotor or the stator, each of the magnets having a body with at least one edge aligned parallel with the rotor axis along the entire length of said edge and a magnetic field with a centerline that is not aligned with the rotor axis, wherein each magnet includes a first side facing the stator or the rotor and a second side facing the other of the stator or the rotor, the second side of each magnet including at least one surface that is nonparallel with the rotor axis.

11. The assembly of claim 10, wherein the first side of the magnets is configured to conform to a corresponding surface on the stator or the rotor.

12. The assembly of claim 10, wherein the second side surface includes edges that are nonparallel with the rotor axis.

13. The assembly of claim 11, wherein the second side surface edges are parallel to each other.

14. The assembly of claim 10, including a distance between the second side surface and the first side that varies along a length of the body.

15. The assembly of claim 14, wherein the second side surface is ramped relative to the first side.

16. A magnet for use in a magnetic motor assembly, comprising:
    a body having a central axis along which a portion of the body is aligned, a first side that faces in a first direction and a second side facing opposite the first side, the second side including at least one surface that is oriented to be non-parallel with the body central axis, a distance between the second side surface and the first side that varies along a length of the body, and a magnetic field having a centerline that is skewed relative to the body central axis.

17. A magnet for use in a magnetic motor assembly, comprising:
    a body having a central axis along which a portion of the body is aligned, a first side that faces in a first direction and a second side facing opposite the first side, the second side including at least one surface that is oriented to be non-parallel with the body central axis, a plurality of surfaces on the second side, a first one of the surfaces having a constant width and a second one of the surfaces having a varying width, and a magnetic field having a centerline that is skewed relative to the body central axis.

18. A motor assembly, comprising:
    a stator;
    a rotor that rotates about a rotor axis relative to the stator; and
    a plurality of magnets supported by either the rotor or the stator, each of the magnets having a body aligned parallel with the rotor axis, a first side facing the stator or the rotor and a second side facing the other of the stator or the rotor, the second side of each magnet including at least one surface that is nonparallel with the rotor axis, a distance between the second side surface and the first side surface that varies along a length of the body, and a magnetic field with a centerline that is not aligned with the rotor axis.

* * * * *

UNITED STATES PATENT AND TRADEMARK OFFICE
CERTIFICATE OF CORRECTION

PATENT NO. : 6,713,922 B2  Page 1 of 1
DATED : March 30, 2004
INVENTOR(S) : Piech et al.

It is certified that error appears in the above-identified patent and that said Letters Patent is hereby corrected as shown below:

<u>Column 4,</u>
Line 22, "claim 11" should read as -- claim 12 --.

Signed and Sealed this

Nineteenth Day of April, 2005

JON W. DUDAS
*Director of the United States Patent and Trademark Office*